United States Patent [19]

Eriksson

[11] Patent Number: 5,668,866
[45] Date of Patent: Sep. 16, 1997

[54] APPARATUS FOR PROTECTING A SUBSCRIBER LINE INTERFACE CIRCUIT AGAINST OVERVOLTAGES

[75] Inventor: Hans O. Eriksson, Järfälla, Sweden

[73] Assignee: Telefonaktiebolaget LM Ericsson, Stockholm, Sweden

[21] Appl. No.: 602,838

[22] PCT Filed: Jun. 28, 1995

[86] PCT No.: PCT/SE95/00800

§ 371 Date: May 8, 1996

§ 102(e) Date: May 8, 1996

[87] PCT Pub. No.: WO96/01015

PCT Pub. Date: Jun. 28, 1995

[30] Foreign Application Priority Data

Jun. 28, 1994 [SE] Sweden ................................. 9402277

[51] Int. Cl.$^6$ ................ H04M 1/74; H02H 9/04
[52] U.S. Cl. ................ 379/412; 379/373; 379/399; 361/56; 361/119
[58] Field of Search ................ 379/412, 398, 379/394, 199; 361/117, 118, 119, 91

[56] References Cited

U.S. PATENT DOCUMENTS

| 4,254,442 | 3/1981 | Dijkmans et al. | 361/56 |
|---|---|---|---|
| 4,377,832 | 3/1983 | Toney et al. | 361/56 |
| 4,456,940 | 6/1984 | Hammerberg et al. | 361/56 |
| 4,661,979 | 4/1987 | Jakab | 379/412 |
| 4,908,854 | 3/1990 | Löfmark | 379/373 |
| 5,003,588 | 3/1991 | Wingerath | 379/412 |

*Primary Examiner*—Krista M. Zele
*Assistant Examiner*—Jacques M. Saint-Surin
*Attorney, Agent, or Firm*—Burns, Doane, Swecker & Mathis, L.L.P.

[57] ABSTRACT

An apparatus interfaces with a subscriber line interface circuit (1) and protects the interface circuit (1) against overvoltages exceeding a supply voltage source supplied to the subscriber line interface circuit. The apparatus includes first and second diodes (DA1, DB1) having respective anodes connected to first and second input wires (A, B). The cathodes of the first and second diodes are connected to a positive terminal of the supply voltage source. The apparatus further includes third and fourth diodes (DA2, DB2) having cathodes connected the first and second input wires (A, B). The anodes of the third and fourth diodes are connected to a cathode of a thyristor (TAB). The anode of the thyristor, in turn, is connected to the positive terminal of the supply voltage source, and the gate the thyristor is connected to a negative terminal of the supply voltage source.

4 Claims, 1 Drawing Sheet

APPARATUS FOR PROTECTING A SUBSCRIBER LINE INTERFACE CIRCUIT AGAINST OVERVOLTAGES

TECHNICAL FIELD

The present invention relates to apparatus for protecting a subscriber line interface circuit against overvoltages appearing on its two input wires and exceeding the voltage of the supply voltage source of the subscriber line interface circuit.

BACKGROUND ART

It is known to protect subscriber line interface circuits against overvoltages, primarily against overvoltages in the form of lightening-induced overvoltage pulses caused, with the aid of a so-called primary protector which may, for instance, consist in a spark gap which functions to reduce the overvoltages on the subscriber line to a voltage of about one kilovolt. A so-called secondary overvoltage protector is fitted to the subscriber line, to deal with these residual pulses of about one kilovolt. The secondary overvoltage protector may have the form of a known circuit marketed by General Semiconductor under the trademark TRANSZORB, or a circuit marketed by RCA under the trademark SURGECTOR.

Current standards require the secondary overvoltage protector to be earthed to the apparatus stand with a separate wire. However, this can create problems that are manifested in the form of residual pulses in the order of magnitude of some hundred volts across a subscriber line interface circuit connected to the subscriber line. Modern line interface boards, in which the line interface circuit is a monolithic integrated circuit, are very often broken-down by lightening, due to residual pulses from the secondary overvoltage protector appearing across the two input wires of the circuit board.

U.S. Pat. No. 4,456,940 teaches an overvoltage protector which includes, among other things, two diodes whose anodes are each connected to a respective input terminal of a subscriber line interface circuit and whose cathodes are connected to earth, and further includes two thyristors whose cathodes are each connected to a respective input terminal on the subscriber line interface circuit and whose anodes are connected to earth. The thyristor gates are connected to the supply voltage of the subscriber line interface circuit. This protective circuit protects the subscriber line interface circuit against overvoltages. However, the thyristors are relatively space-consuming and a reduction in their number would be a significant advantage. It is sometimes necessary to match the thyristors, so that they will ignite or fire simultaneously, i.e. for the same voltage across the cathodes with equal voltage across the gate. However, the document does not describe several cascade-connected overvoltage protectors.

SUMMARY OF THE INVENTION

The object of the invention is to eliminate the effect on a subscriber line interface circuit of residual pulses that emanate from secondary overvoltage protectors.

This object is achieved with apparatus according to the invention and having the characteristic features set forth in the following claims.

One advantage afforded by the present invention is that the number of thyristors required in the tertiary overvoltage protector has been reduced in comparison with the number required in the known protectors, therewith reducing the space required by the overvoltage protector. Another advantage is that matching between two or more thyristors to ensure that the thyristors will be activated at one and the same voltage level is no longer necessary.

BRIEF DESCRIPTION OF THE DRAWING

The invention will now be described in more detail with reference to the accompanying drawing, in which.

BEST MODE OF CARRYING OUT THE INVENTION

Figure 1:
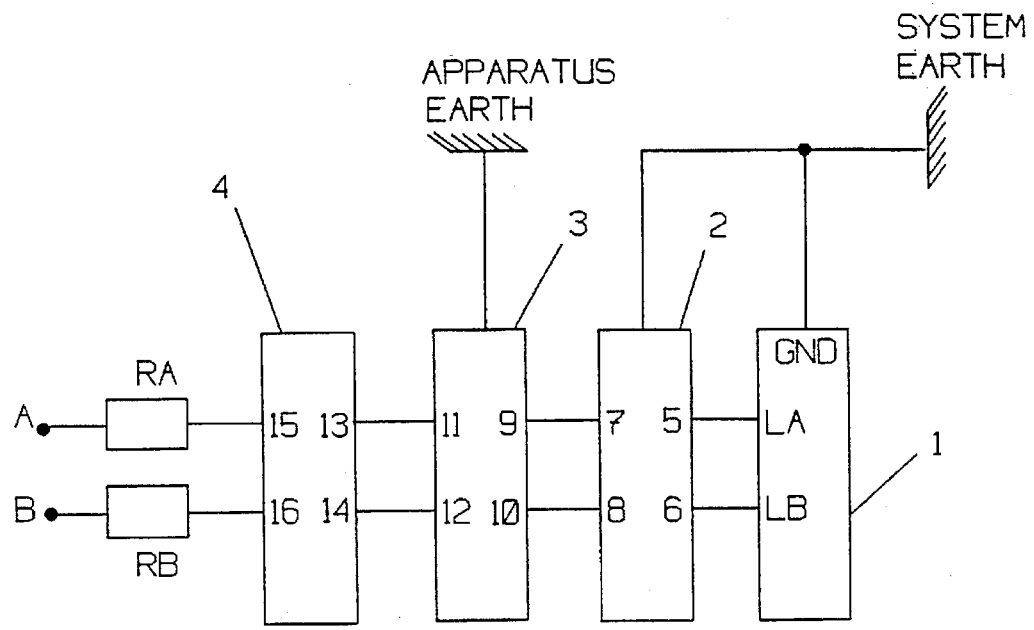
FIG. 1 is a block schematic which illustrates a primary overvoltage protector circuit, a secondary overvoltage protector circuit and a tertiary overvoltage protector circuit connected to a subscriber line interface circuit.

FIG. 1 is a block schematic illustrating an inventive total overvoltage protector for a subscriber line interface circuit 1. The subscriber line interface circuit 1 has its input terminals LA and LB connected to a pair of outlet terminals 5, 6 on a tertiary overvoltage protector 2. The tertiary overvoltage protector 2 has two input terminals 7, 8 connected in cascade to two output terminals 9, 10 of a secondary overvoltage protector 3, which in turn has two input terminals 11, 12 connected in cascade to two output terminals 13, 14 of a primary overvoltage protector 4. The primary overvoltage protector 4 has two input terminals 15, 16, each of which is connected to a respective resistor RA and RB, the resistances of which are normally in the order of 10 ohms and each of which is connected to a respective input wire A and B of the subscriber line interface circuit 1. The primary overvoltage protector 4 is normally of a known kind, i.e. a spark gap, and the secondary overvoltage protector 3 is normally of a known kind, such as the kind designated TRANSZORB or SURGECTOR. As shown in the Figure, the tertiary overvoltage protector 2 and the subscriber line interface circuit 1 are connected to system earth, whereas the secondary overvoltage protector 3 is connected to apparatus earth.

Overvoltage pulses that are caused by lightening for instance, and which occur on the two input wires A and B of the circuit 1 are reduced by the primary protector 4 to residual pulses in the order of one kilovolt, these residual pulses being reduced to the order of some hundred volts by the secondary overvoltage protector. These residual pulses arriving from the secondary protector 3 and having a voltage level which exceeds the supply voltage to the subscriber line interface circuit are eliminated by the tertiary overvoltage protector 2.

Figure 2:
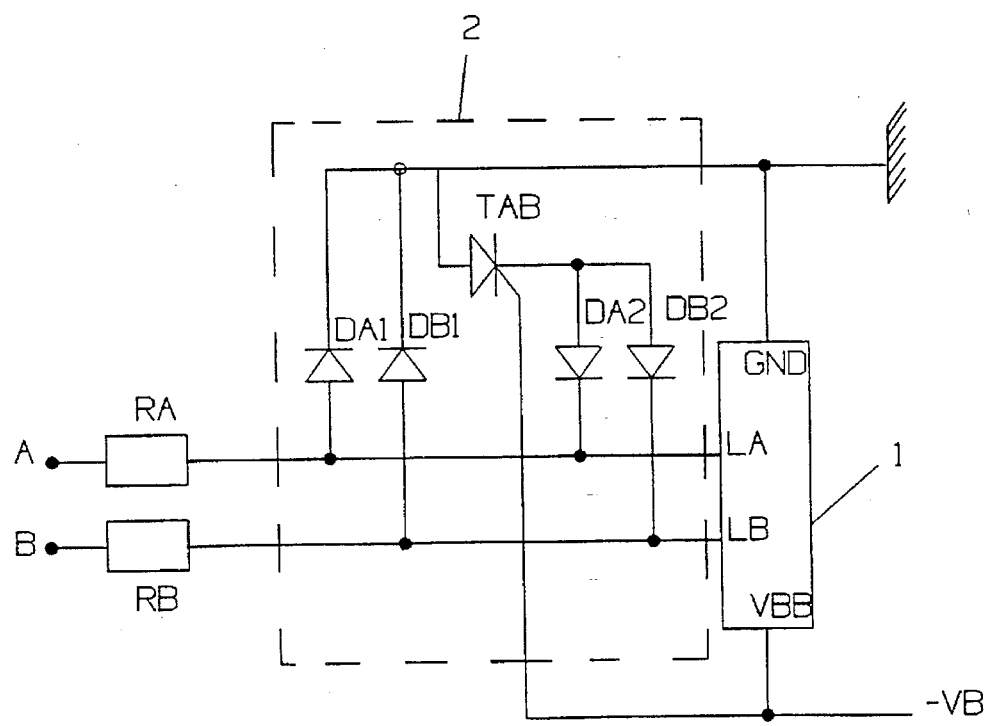
FIG. 2 illustrates an embodiment of a tertiary overvoltage protector circuit according to the invention for a subscriber line interface circuit.

The inventive tertiary overvoltage protector 2 is shown in broken lines in FIG. 2. The secondary and primary overvoltage protectors have been omitted from the FIG. 2 illustration, and the tertiary overvoltage protector 2 is shown connected directly to the resistors RA and RB. The input terminals LA, LB of the subscriber line interface circuit 1 are each connected to the anode of a respective first diode DA1, DB1, the cathodes of which first diodes are connected to system earth. The input terminals LA and LB are also each connected to the cathode of a respective second diode DA2 and DB2, wherein the anodes of the second diodes are connected to the cathode of a thyristor TAB which is common to said second diodes and the anode of which is connected to system earth and the gate of which is connected to a connection terminal on the voltage-supply source of the interface circuit 1, said supply voltage source having the potential −VB. The tertiary overvoltage protector 2 thus includes the first diodes DA1 and DB1, the second diodes DA2 and DB2 and the thyristor TAB.

The subscriber line interface circuit 1 is supplied between earth and the voltage −VB, which is normally −50V. The input terminals GND and VBB of the subscriber line interface circuit 1 are therefore connected to system earth and the potential −VB respectively.

Occurring overvoltages will be restricted in the following manner:

Positive overvoltages are restricted with the aid of the diodes DA1, DB1, whereas negative overvoltages are restricted to about 2V beneath −VB, in other words more negative than −VB, where 2V corresponds to the sum of the forward voltage drop of respective diodes DA2, DB2 and the forward voltage drop across the gate for turning on the thyristor TAB. The input terminals LA, LB are drawn to earth when the thyristor TAB ignites.

The inventive protective circuit is thus effective in eliminating the problem associated with the breakdown of subscriber line interface circuits that are subjected to lightening induced overvoltage pulses.

I claim:

1. An apparatus for protecting a subscriber line interface circuit against overvoltages exceeding a supply voltage source supplied to the subscriber line interface circuit, wherein said overvoltages occur on first and second input wires which are connected to said interface circuit via respective first and second input terminals of said interface circuit, wherein resistors are connected in series with respective said input wires, wherein said first and second input terminals are connected to anodes of respective first and second diodes, and wherein cathodes of the first and second diodes are connected to a positive terminal of the supply voltage source, further wherein said first and second input terminals are also connected to cathodes of respective third and fourth diodes, wherein anodes of said third and fourth diodes are connected to a cathode of a thyristor, wherein an anode of the thyristor is connected to the positive terminal of the supply voltage source and a gate of said thyristor is connected to a negative terminal of said supply voltage source.

2. The apparatus of claim 1, wherein said negative terminal of the supply voltage source supplies a voltage values of approximately −50 volts.

3. An apparatus for protecting a subscriber line interface circuit against overvoltages that exceed a supply voltage source supplied to said subscriber line interface circuit, wherein said overvoltages occur on first and second input wires which are connected to respective input terminals of a primary overvoltage protector, wherein resistors are connected in series with respective said input wires, wherein said primary overvoltage protector is connected in cascade to a secondary overvoltage protector and said secondary overvoltage protector is connected in cascade to a tertiary overvoltage protector, and said tertiary overvoltage protector is connected in cascade to the subscriber line interface circuit via first and second input terminals, wherein the secondary overvoltage protector is connected to apparatus earth, wherein said respective first and second input terminals of the subscriber line interface circuit are connected to anodes of respective first and second diodes and wherein cathodes of the first and second diodes are connected to a positive terminal of the supply voltage source, further wherein the tertiary overvoltage protector also includes a thyristor and third and a fourth diodes, wherein said respective input terminals of the subscriber line interface circuit are also connected to respective cathodes of said respective third and fourth diodes, wherein anodes of the third and fourth diodes are connected to a cathode of the thyristor, and wherein an anode of said thyristor is connected to the positive terminal of the supply voltage source and a gate of the thyristor is connected to a negative terminal of the supply voltage source.

4. The apparatus of claim 3, wherein said negative terminal of the supply voltage source supplies a voltage values of approximately −50 volts.

* * * * *